Jan. 8, 1946.　　A. G. F. WALLGREN　　2,392,348
OIL FILTER
Filed Oct. 23, 1940　　2 Sheets-Sheet 1
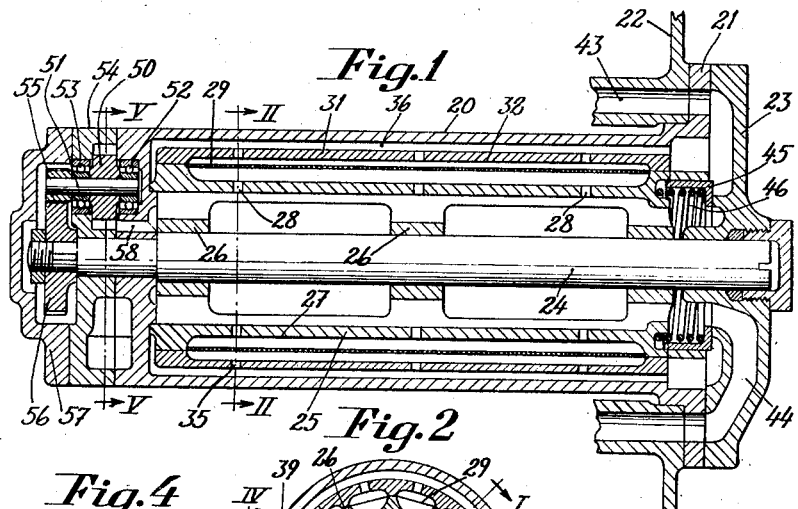
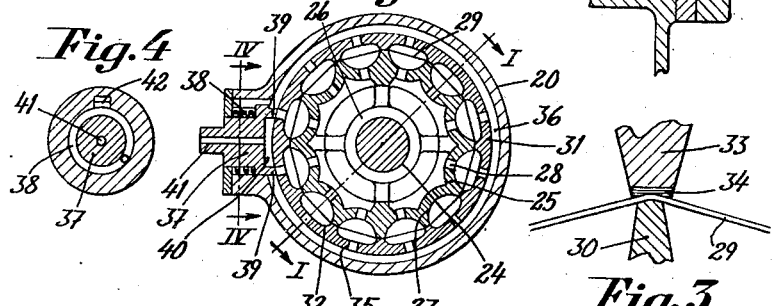
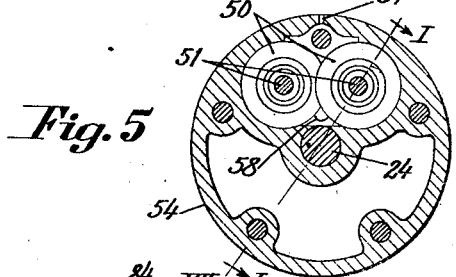
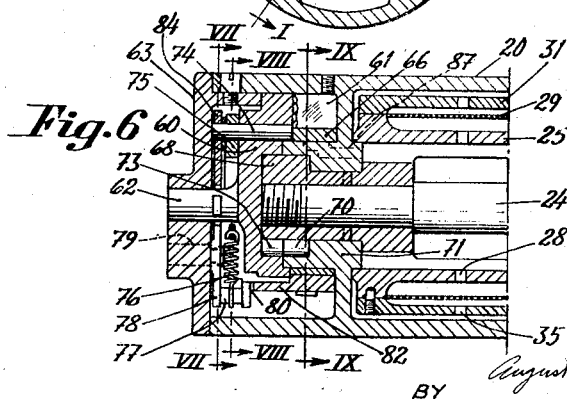
INVENTOR.
August Gunnar Ferdinand Wallgren
BY
his ATTORNEY.

Jan. 8, 1946.　　A. G. F. WALLGREN　　2,392,348
OIL FILTER
Filed Oct. 23, 1940　　2 Sheets-Sheet 2
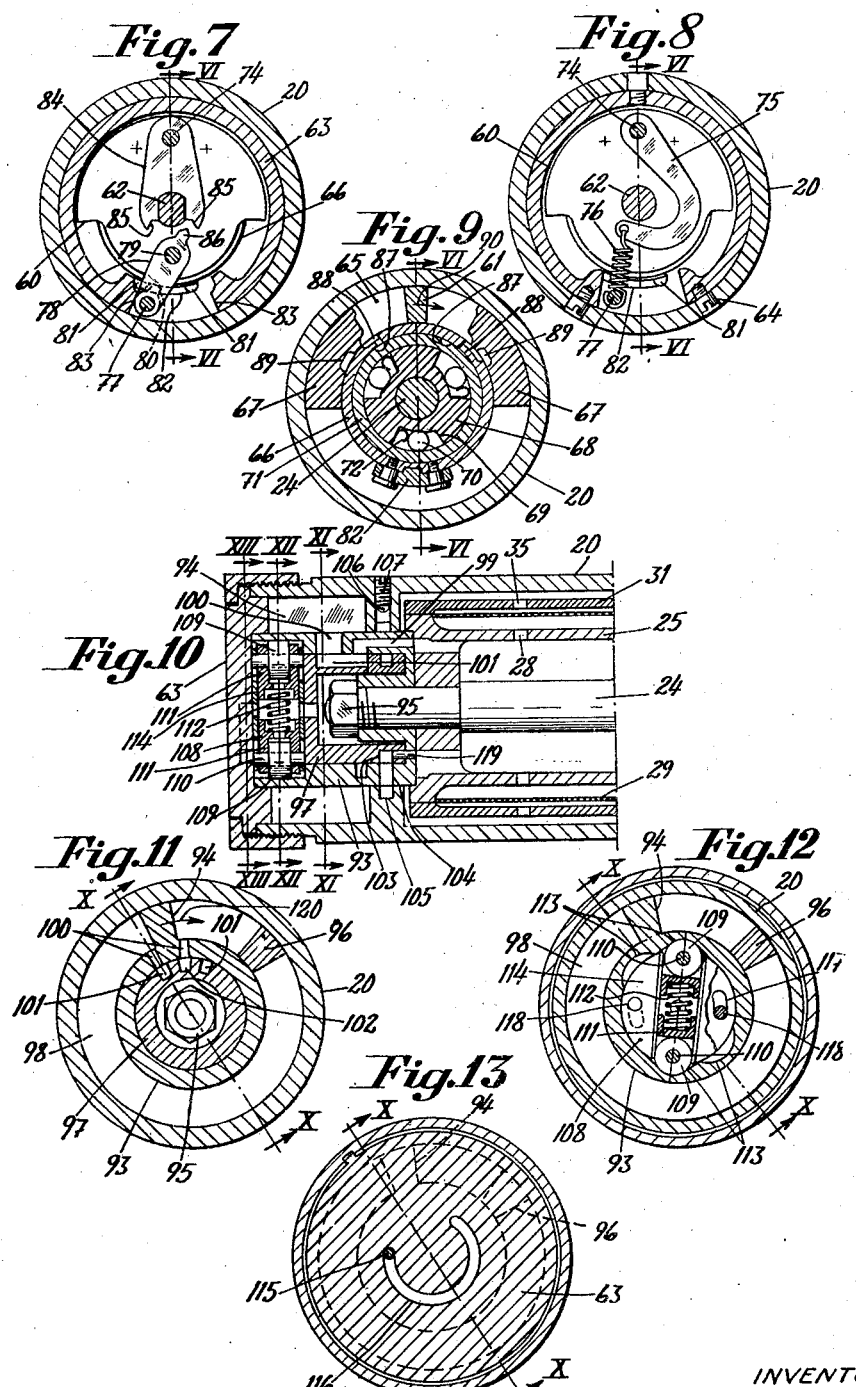
INVENTOR.
August Gunnar Ferdinand Wallgren
BY
Jarvis C. Marble
ATTORNEY.

Patented Jan. 8, 1946

2,392,348

UNITED STATES PATENT OFFICE 2,392,348

OIL FILTER

August Gunnar Ferdinand Wallgren, Eskilstuna, Sweden, assignor to Aktiebolaget Bolinder-Munktell, Eskilstuna, Sweden, a corporation of the Kingdom of Sweden Application October 23, 1940, Serial No. 362,326
In Sweden November 8, 1939

5 Claims. (Cl. 210—167)

Oil filters made from textile material can without difficulty be made sufficiently fine-meshed to ensure a far carried purification of the oil. Such textile filters have many drawbacks, however. They are difficult to clean, the filter material decays in the oil, and, furthermore, the meshes are clogged up by water which may be comprised in combustible oil, for example. All this has contributed toward the fact that metal filters are nowadays resorted to more and more. In this type of filter, however, other difficulties are met with, among other things with respect to the cleansing capacity of the filters.

It is one essential object of the invention to make it possible to purify the oil to such an extent, without the same being subjected to an inadmissibly high fall in pressure within the filter, that the remaining particles in the oil, should the latter be intended for the lubrication of frictional bearings, for example, will have a diameter smaller than the thickness of the film in these bearings. Thus the particles which are not separated in the filter shall be able to pass through the bearing without causing any detrimental effect on the bearing surfaces. Corresponding demands are made on the degree of purification in filters adapted for instance for combustible oil having to pass through a fuel nozzle. Hitherto, metal filters were constructed consisting, among other things, of spirally wound thin sheet metal strips with a spacing of the convolutions of the winding of about 0.03 mm., which does not give a satisfactory filtration of the oil. The oil resistance, which will be particularly great in this case by reason of the great space length in the direction of flow of the oil, would at still less widths of the space exceed practically suitable values. To reduce the resistance of the filter it has also been suggested to make use of metal wires wound adjacent to each other with a spacing determining the cleansing capacity of the filter.

When continuously used the filter is to be cleaned, for which purpose it is known to employ brushes that scrape over the elements or the wire winding on rotating a drum carrying the same. In this way, the cleansing of the filter is rendered incomplete. Particles remain in the filter spaces, which involve an increased resistance to the oil, because the points of the bristles cannot penetrate down into these spaces, particularly if they are very small. It was therefore necessary to make the width of the space comparatively great, if any cleansing effect were to be reached at all without the filter becoming clogged up. It is also known to provide a flow of oil opposite to that of normal filtering through the spaces of the filter in order to remove particles collected thereon. This counterflow is effected in a mechanical way by establishing a pressure higher than the oil pressure in the filter. This known construction is, however, relatively complicated and moreover a reliable cleansing cannot be ensured as particles after being removed from the filter are floating in the oil, which is on the way to the filter, whereby such particles are again deposited there. Moreover, it is difficult to provide a counterflow of sufficient effectiveness to ensure a proper cleansing.

In accordance with the invention, a rotatable drum carrying the filter means, such as wires, communicates over a portion of its periphery with a chamber in which a pressure lower than the oil pressure in the filter means is prevailing, so that a counterflow is set up in that portion of the drum, which during the rotary movement is momentarily in alignment with the chamber. An efficient cleansing is in this way ensured independently of the width of the spaces between the wires, and consequently said width may be reduced to the small dimensions stated hereinabove. The oil filter is rendered exceedingly safe in operation while it will at the same time be capable of relieving the oil even of very small impurities. The wires may have a diameter as small as 0.1 mm. and less, whereby the resistance to flow is reduced in a very high degree. Moreover, the dimensions of the filter become small in comparison with previous constructions. In modern motors provided with forced circulation lubrication and cooling of the bearings and pistons or the like, the quantity of oil to be cleansed by the filter per unit of time will be many times greater than previously. The oil filter produced in accordance with the invention is well apt to answer the increased demands.

Further objects and advantages of the invention will be apparent from the following description considered in connection with the accompanying drawings which form a part of this specification, and of which:

Fig. 1 is a longitudinal section taken on the line I—I in Figs. 2 and 5 through an oil filter constructed in accordance with the invention;

Fig. 2 is a section taken on the line II—II of Fig. 1;

Fig. 3 shows detail in the same section as in Fig. 2 but on an enlarged scale;

Fig. 4 is a section taken on the line IV—IV of Fig. 2;

Fig. 5 is a section taken on the line V—V of Fig. 1;

Fig. 6 is a longitudinal section of a portion of an oil filter according to a modified embodiment for rotating the oil filter; the figure being a section taken on the lines VI—VI of Figs. 7-9;

Figs. 7-9 are sections taken on the lines VII—VII, VIII—VIII, and IX—IX, respectively, of Fig. 6;

Fig. 10 shows a longitudinal section through a portion of an oil filter according to a further embodiment of the invention; the figure being a section taken on the lines X—X of Figs. 11-13;

Figs. 11-13 are sections taken on the lines XI—XI, XII—XII, and XIII—XIII, respectively, of Fig. 10.

In the drawings, 20 designates a preferably cylindrical casing which is rigidly connected to a frame, such as a motor casing 22, by means of a flange 21. A shaft 24 is rotatably mounted in the casing 20 and in a cover 23 rigidly connected with the frame, said shaft having a drum 25 secured thereto. The drum 25 is connected with the shaft over a number of hub portions 26 permitting a free axial passage of the oil within the drum. The outer periphery of the drum 25 is formed with a plurality of longitudinally extending groove-shaped recesses 27, each communicating with the interior of the drum, preferably through a plurality of apertures 28. A metal wire 29, preferably from stainless steel, is wound about the drum so as to bear on the outer edge of the walls 30 (Fig. 3) between each pair of recesses 27.

The wire 29 has a diameter of the size of 0.1 mm. It is wound about the drum in a manner such that there will be a space between the wire convolutions which is preferably less than 0.025 mm., preferably about 0.01 mm. The winding is preferably effected with the aid of a machine provided with a feeding device, such as a lathe, so that the wire is subjected to a certain tension so as to be embedded into the outer edges of the walls 30. The drum 25 may be made from relatively soft material, such as brass.

A sleeve 31 having recesses 32 separated by walls 33 (Fig. 3) of the same number and peripheral extension as that of the recesses 27 and the walls 30, respectively, is threaded rigidly onto the outside of the drum 25. A layer of tin 34 may be provided between the walls 30 and 33, so that the compartments limited by the latter will be separated from one another in the peripheral direction. Likewise, the outer sleeve 31 is preferably provided with a number of apertures 35 for each recess 32 which communicate with a space 36 between the sleeve and the outer casing 20.

A plunger 37 (Fig. 2) is provided in the casing 20 and is pressed against the cylindrical outer surface of the sleeve 31 with the aid of a spring 38 and by the oil pressure acting upon the same. The plunger 37 bears on the sleeve 31 with two projections 39 which are spaced in the peripheral direction about equal to the spacing of the apertures 35 in the sleeve 31, as will appear from Fig. 2. A chamber 40 which is limited laterally by the projections 39 communicates with an outlet conduit through a passage 41 in the sleeve. The plunger 37 is guided by a boss 42.

The oil to be cleansed is introduced, for instance, by means of a pump, through a passage 43 in the elements 22, 21 to the inside of the cover 23 and thence to the above-mentioned space 36 between the sleeve 31 and the outer casing 20. The pure oil escapes from the interior of the drum 25 through a passage 44. Provided between the passages 43 and 44 is a sleeve valve 45 which is normally closed. The valve 45 is then under the pressure of a spring 46. However, should the drop in pressure within the filter become too great, for instance by the oil being cold at the starting of the motor, the valve 45 will be opened while overcoming the resistance of the spring, so that the oil may be conveyed momentarily past the filter to the outlet 44.

The shaft 24, together with the elements 25, 31 connected therewith, and the wire winding 29 are driven in the embodiment according to Figs. 1-5 by a gear wheel motor consisting of two gear wheels 50 of a construction known per se, the shafts 51 of which are carried by bearings 52, 53. These bearings are provided in the casing 20 and in an annular element 54 rigidly connected therewith. One of the shafts 51 communicates over a gearing 55, 56 with the shaft 24. The said gearing is enclosed within a cover 57. Oil under pressure is supplied to the gear wheel motor from the inside of the drum 25 through a conduit 58, and escapes through a conduit 59. Members for the control of the oil quantity passing through the motor may be provided in the outlet conduit.

The device operates in the following manner.

The impure oil entering the space 36 between the sleeve 31 and the frame 20 flows through the apertures 35 into the chambers 32 and then passes through the fine spaces between the windings of the wire 29, the solid particles comprised in the oil being then separated on the outside of the wire. The clean oil continues through the spaces 27, the openings 28, the interior of the drum 25 to the outlet conduit 44.

Filtered oil is taken from the inside of the drum to operate the gear wheels 50. The shaft 24 with the elements 25 and 31 is rotated at a properly determined, relatively slow rate of speed. On rotation of the elements 25, 31 the openings 35 pass successively past the chamber 40, whereat, as will be seen from Fig. 2, only that opening or those openings which communicate with one and the same recess are brought every time into communication with this chamber. While a pressure above atmospheric prevails in the interior of the drum 25, the pressure within the chamber 40 is lower for the reason that the passage 41 is in open communication with the atmosphere or with a collecting space or the like. During the time in which an opening 35 thus moves past the chamber 40, a flow of oil will be produced in a direction opposed to the direction during filtration through the portion of the wire winding 29 lying inside the opening, that is to say, from the interior of the drum 25 and outwardly through the space 27, the fine spaces between the wire convolutions, the space 32, and the opening 35. The solid particles adhering to the outside of the wire winding are then washed off to escape with the oil through the passage 41. It will appear from the above that for every revolution only a small portion of the peripheral circumference of the wire winding will communicate with the cleansing chamber 40. The spaces 27, 32 are separated laterally from each other by the walls 30, 33, so that only the portion of the wire winding being between two such pairs of walls will at the same time be brought into communication with the outlet chamber 40. In the present case, there are twelve such spaces 27, 32, from which it will be seen that a twelfth of the wire winding at a time will be subjected to cleansing. According to the invention, the filter is self-cleansing and operates altogether automatically. If desired, a number of chambers 40 may be arranged behind one another, one for each opening 35 pertaining to one and the same space 27, 32.

In the embodiment above described, the hydraulically operating driving mechanism is adapted to drive the filter drum continuously in one and the same direction. Figs. 6–9 show a modified embodiment of a hydraulic driving mechanism adapted to actuate the shaft 24 intermittently. Otherwise, this embodiment (like that according to Figs. 10–13) may be constructed in the same manner as that above described, and the same reference numerals have been used for equivalent parts.

A vane piston 60 provided with a vane 61 is rotatably mounted by means of a pin 62 in a cover 63 which is centered in the casing 20 and secured to the latter by means of screws 64. The vane 61 is reciprocating within a space 65 (Fig. 9), which is bounded outwardly by the casing 20 and inwardly by a slide 66, and in the peripheral direction by two blocks 67 connected with the casing 20 in a suitable way.

Rigidly connected with the shaft 24 is a hub sleeve 68. This hub sleeve is provided with recesses 69 for locking rollers 70 adapted to cooperate with an eccentric roller track at the bottom of the recesses 69 and bearing against the upper cylindrical surface of a partition 71 in the casing 20. The rollers 70 may be actuated by springs 72 tending to move the rollers into locking position. In a similar manner, rollers 73 (Fig. 6) are provided between the hub sleeve 68 and the vane piston 60. The rollers 73 and 70 are adapted to cooperate with the elements 60, 68 on the one hand, and with the elements 68, 71 on the other hand, in a manner such that the shaft 24 will be driven when the vane piston moves in one direction, whereas it will be locked when the vane piston moves in the opposite direction. Thus the locking members 70, 73 are operative alternately at the movement of the vane piston in the one or the other direction.

A pin 74 is secured in the vane piston 60 at a distance from the center pin 62 thereof. Pivotally mounted on the pin 74 is a hook-shaped arm 75. The arm 75 serves on the opposite side of the pin 62 as an attachment for one end of a spring 76, the other end of which is arranged about a pin 77. The pin 77 is carried by an arm 78 which is pivotally mounted about a pin 79 rigidly connected with the head cover 63.

The arm 78 carries a catch 80 entering between two projections 81 on an arm 82 which is rigidly connected with the slide 66. Thus when the arm 78 moves between two abutments 83 (Fig. 7) on the cover 63, the catch 80 will in a certain position strike against either of the projections 81 so as to carry along the arm 82 and the slide 66 to one of the extreme positions, as will be described more fully in the following.

The arm 78 is actuated by an arm 84 which is rigidly connected with the vane piston 60 through the pin 74 and the shaft 62. The arm 84 is provided with two projections 85 to which corresponds a point on the arm 78.

Two passages 87 (Figs. 6 and 9) extend in the partition 71 from the interior of the drum 25 toward two passages 88 in the slide 66. The peripheral distance between the two passages 87 is less than that between the passages 88. The peripheral extension of the passages 88 on the outside of the slide is of such magnitude that they will in certain positions connect the space 65 on the one side of the vane 61 with outlets 89 in either of the blocks 67.

The device according to Figs. 6–9 operates in the following manner. In Fig. 9, passages 87 and 88 are in alignment on the left hand side of the vane 61. Pressure oil is consequently introduced into the space 65 on the left hand side of the vane 61 so as to move the latter in the direction of the arrow 90. In this movement the vane piston 60 and the hub sleeve 68 is carried along as the locking rollers 73 are in their operative position. On the other hand, the locking rollers 70 are inactive. The vane piston 60 also carries along the arm 84 in its rotary movement. When the vane 61 approaches the extreme position of its path of movement, the projection 85 of the arm 84 is brought into contact with the end portion 86 of the arm 78, and commences to turn this arm. When the arm 78 is brought over the center, that is to say the labile middle position, it will be pulled by the spiral spring 76 toward the opposite abutment 83. The catch 80 of the arm 78 will then hit the abutment 81 on the arm 82 shown to the right in Fig. 7, and in this way carries along the slide 66 in its rotary movement, until the arm is stopped by the said abutment 83. This involves that the slide 66 is turned in a counter-clockwise direction in Fig. 9 so that the passage 88 positioned on the right hand side of the vane piston is brought into connection with the corresponding pressure oil passage 87, while the other passage 88 is brought into connection with the outlet 89 in the left hand block 67. Thus the vane 61 is now subjected to pressure on the other side thereof so as to move in a direction opposed to that of the arrow 90. During this return movement the shaft 24 is locked by the locking rollers 70, whereas the locking rollers 73 are released from their locking engagement. Another shifting of the slide occurs at the end of the return movement in the manner above described, whereupon the vane piston performs its next working stroke, and so forth.

The arm 75 has for its object further to increase the turning moment by which the arm 78 pulls the slide 66 toward the new position. The driving mechanism according to Figs. 6–9 also operates entirely automatically, as will be seen from the above, but at a stepwise rotation of the shaft 24.

The embodiment according to Figs. 10–11 is also provided with a vane piston 93 provided with a vane 94, which in this embodiment, however, is rigidly connected with the shaft 24 by means of a nut 95 or the like, so that this shaft will, together with the filter drum 25, 31, follow the vane piston in its reciprocating movement. The length of stroke of the vane piston corresponds in this case to a rotary movement of the shaft 24 a little short of a complete revolution. The length of stroke is limited by an element 96 which is rigidly connected with the stationary outer casing 20.

Disposed in the vane piston 93 is a slide 97. Filtered oil under pressure is supplied to the space 98 (Fig. 11) having the vane 94 operating therein, through a passage 99 and either of two passages 100 in the vane piston and either of two passages 101 in the slide 97. The oil contained in the space 98 on the opposite side of the vane 94 escapes through either one of the two passages 100 in the vane piston 93 to a passage 102 in the slide 97 and over a passage, not shown, to a slot 103 in the slide, a radial passage 104 in the vane piston, and finally to an annular groove 105 and passages 106 in the casing 20. The quantity of oil and thus the rate of movement of the vane piston are adjustable by means of a screw 107.

In this embodiment, the shifting movement between the vane piston 93 and the slide 97 is effected with the aid of a mechanism, generally designated by 108, which is provided radially inside the end portion of the vane piston and between the slide 97 and the cover 63. This mechanism consists of two diametrically opposed rollers 109 carried by shafts 110 which, in turn, are mounted each in a holder 111. Provided between these holders is a spring member 112 tending to move the holders and the rollers 109 outwardly into contact with the inside of the vane piston. The latter is provided on both sides of the vane 95 with pairs of recesses 113 entered alternately by the rollers. The holders 108 together with the rollers 109 are guided at a suitable radial freedom of movement by two disks 114 one of which is connected with a pin 115 engaging a slot 116 in the cover 63. The slot 116 has a peripheral extension which is smaller than the angle of movement of the vane piston. The other disk 114 is formed with slots 117 entered by pins 118 from the slide 97. The grooves 117 permit of a small relative rotary movement between the slide and the mechanism 108 which is sufficient to shift the communications between the passages 100 and 101. A pin 119 enters from the slide 97 into a groove in the vane piston 93, which permits of the same or substantially the same relative rotary movement between these two elements.

In Fig. 11, the slot 100 on the left hand side of the vane 94 is through the pressure oil passage 101 in communication with the interior of the filter. The vane piston 93 therefore moves according to the arrow 120 in the same figure and carries along the slide 97 over the pin 119.

The rollers 109 of the shifting mechanism 108 are in engagement with two opposed recesses 113 in the piston slide (see Fig. 12). The pins 118 of the slide are in the one extreme position in the slots 117, that is to say, so that the mechanism 108 cannot be turned further relatively to the slide in the direction of movement of the vane 94. When during its movement the vane piston is at a certain angle from its returning position, the pin 115 reaches the end of the slot 116 (see Fig. 13). While the vane piston and the slide continue their rotary movement, the shifting mechanism 108 is thus stopped. This results in that the rollers 109 roll up the walls of the two opposed grooves 113 with which they are in engagement. When the rollers have come up on the edge between the pairs of grooves 113, the slot 117 of the mechanism 108 will at the same time have been brought into contact with the pins 118 at the opposite end of the slots as before. The rollers 109 now strike over into the other pairs of recesses 113, the slide 97 being carried along and displaced relatively to the vane piston. Through this relative movement the pin 118 has reached the opposite end of the slot 116 of the vane piston cooperating therewith. Furthermore, the slot 102, which previously communicated with the right hand passage 100 in the vane piston according to Fig. 11, has been shifted to alignment with the previously inactive supply passage 101, so that pressure oil is introduced to the opposite side of the vane 94. The latter returns and then carries along the shifting mechanism and the slide, until the same shifting operation occurs at the end of the next stroke, and so forth.

The hydraulically acting motion mechanism may be combined with a mechanically or manually operable rotating device. In certain cases it is also conceivable to drive the filter solely by means of a mechanical device, although the hydraulic operation is for many reasons to be preferred, for instance by the fact that the filter can be placed in a motor independently of the special position of the rotating shafts thereof. In filters for combustible oil, the width of the spaces of the filtering elements may be still less than that stated hereinbefore. In such cases the wire may be wound so that the wire convolutions are brought into direct contact with each other. On account of unavoidable divergencies of the wire diameter, fine spaces will then be produced, which are sufficient for the passage of the combustible oil. According to the invention, the diameter of the wire in a filter for lubricating oil or combustible oil is preferably less than 0.25 mm.

While several embodiments of the invention have been shown, it is to be understood that these are for purpose of illustration only, and that the invention is not to be limited thereby, but its scope is to be determined by the appended claims viewed in the light of the prior art.

What I claim is:

1. In a filter, a casing, a drum rotatably mounted within said casing, the exterior surface of said drum being formed with a plurality of axially extending grooves and with an opening extending through the drum from each groove, a sleeve secured to and surrounding said drum, the interior surface of said sleeve being formed with a like number of axially extending grooves in alignment with the grooves in said drum, said sleeve being formed with an opening extending therethrough from each groove therein, filter means disposed between said drum and said sleeve, means for introducing fluid to be filtered to the outside of said sleeve, means for withdrawing filtered fluid from the interior of said drum, means including members bearing against the outside of said sleeve providing a chamber of limited peripheral extent adjacent thereto, means for maintaining a pressure in said chamber lower than that of the filtered fluid within said drum, and means for rotating said drum and sleeve so as to bring the openings in said sleeve successively into communication with said chamber, whereby counterflow of fluid takes place through successive portions of said filter means from within said drum to said chamber.

2. In a filter, a casing, a drum rotatably mounted within said casing, the exterior surface of said drum being formed with a plurality of axially extending grooves, separated by ribs and with an opening extending through the drum from each groove, a sleeve secured to and surrounding said drum, the interior surface of said sleeve being formed with a like number of axially extending grooves separated by ribs, the ribs on said drum and on said sleeve being in alignment, said sleeve being formed with an opening extending therethrough from each groove therein, wire filter means disposed between said drum and said sleeve, sealing means between aligned ribs in the sleeve and drum to prevent peripheral flow between adjacent grooves, means for introducing fluid to be filtered to the outside of said sleeve, means for withdrawing filtered fluid from the interior of said drum, means including members bearing against the outside of said sleeve providing a chamber of limited peripheral extent adjacent thereto, means for maintaining a pressure in said chamber lower than that of the filtered fluid within said drum, and means for rotating said drum and sleeve so as to bring the openings in said sleeve successively into communication with said chamber, whereby counterflow of fluid takes place through successive portions of said filter means from within said drum to said chamber.

3. In a filter, a casing, a drum rotatably mounted within said casing, the exterior surface of said drum being formed with a plurality of axially extending grooves separated by ribs and with an opening extending through the drum from each groove, a filter means constituting a fine wire wound helically around said drum and imbedded in grooves formed in to the tops of said ribs, a sleeve secured to and surrounding said drum, the interior surface of said sleeve being formed with a like number of axially extending grooves separated by ribs, the ribs on said drum and on said sleeve being in alignment, said sleeve being formed with an opening extending therethrough from each groove therein, means for introducing fluid to be filtered to the outside of said sleeve, means for withdrawing filtered fluid from the interior of said drum, means providing a chamber having limited peripheral extent adjacent to the outside of said sleeve, means for maintaining a pressure in said chamber lower than that of the filtered fluid within said drum, and means for rotating said drum and sleeve so as to bring the openings in said sleeve successively into communication with said chamber, whereby counter-flow of fluid takes place through successive portions of said filter means from within said drum to said chamber.

4. In a filter, a casing, a drum rotatably mounted in said casing, said drum being formed with a plurality of circumferentially spaced openings therethrough, filter means comprising a wire having a diameter of less than 0.25 mm. spirally wound on said drum and over said openings, adjacent turns of said wire being spaced apart less than 0.025 mm., means for introducing fluid to be filtered to one side of said drum, means for withdrawing filtered fluid from the other side of said drum, means providing a chamber having limited peripheral extent adjacent to said one side of said drum, means for maintaining a pressure in said chamber lower than that of the filtered fluid, and means for rotating said drum so as to bring said openings successively into communication with said chamber, whereby counterflow of fluid through successive portions of said filter means takes place into said chamber.

5. In a filter, a casing, a drum rotatably mounted in said casing, said drum being formed with a plurality of circumferentially spaced openings therethrough, filter means comprising a wire having a diameter of between 0.1 mm. and 0.25 mm. spirally wound on said drum and over said openings, adjacent turns of said wire being spaced apart between 0.01 mm. and 0.025 mm., means for introducing fluid to be filtered to one side of said drum, means for withdrawing filtered fluid from the other side of said drum, means providing a chamber having limited peripheral extent adjacent to said one side of said drum, means for maintaining a pressure in said chamber lower than that of the filtered fluid, and means for rotating said drum so as to bring said openings successively into communication with said chamber, whereby counterflow of fluid through successive portions of said filter means take place into said chamber.

AUGUST GUNNAR
          FERDINAND WALLGREN.